(12) United States Patent
Satou (10) Patent No.: US 10,895,978 B2
(45) Date of Patent: Jan. 19, 2021

(54) NUMERICAL CONTROLLER

(71) Applicant: FANUC CORPORATION, Yamanashi (JP)

(72) Inventor: Shuuji Satou, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 9 days.

(21) Appl. No.: 15/949,584

(22) Filed: Apr. 10, 2018

(65) Prior Publication Data

US 2018/0300053 A1 Oct. 18, 2018

(30) Foreign Application Priority Data

Apr. 13, 2017 (JP) ................................. 2017-079845

(51) Int. Cl.
| | |
|---|---|
| *G06F 3/0488* | (2013.01) |
| *G06F 3/041* | (2006.01) |
| *G06F 3/042* | (2006.01) |
| *G06F 3/0482* | (2013.01) |
| *G06F 3/03* | (2006.01) |
| *G06F 3/0484* | (2013.01) |
| *H04N 21/422* | (2011.01) |
| *G06F 1/16* | (2006.01) |
| *G16H 40/63* | (2018.01) |
| *G06F 3/0489* | (2013.01) |

(52) U.S. Cl.
CPC ........ *G06F 3/04883* (2013.01); *G06F 3/0412* (2013.01); *G06F 3/04886* (2013.01); *G06F 3/0489* (2013.01)

(58) Field of Classification Search
CPC ........ G06F 3/04842–04886; G06F 3/016–038; G06F 1/1692; G06F 3/0489; H04N 21/00–485
See application file for complete search history.

(56) References Cited

U.S. PATENT DOCUMENTS

| | | | | |
|---|---|---|---|---|
| 8,698,764 B1 * | 4/2014 | Karakotsios | .......... | G06F 1/1692 345/173 |
| 10,776,006 B2 * | 9/2020 | Marsden | .............. | G06F 3/04886 |
| 2003/0201971 A1 | 10/2003 | Iesaka | | |

(Continued)

FOREIGN PATENT DOCUMENTS

| | | |
|---|---|---|
| CN | 103605471 A | 2/2014 |
| CN | 105472111 A | 4/2016 |

(Continued)

OTHER PUBLICATIONS

Notification of Reasons for Refusal for Japanese Application No. 2017-079845, dated Nov. 13, 2018, with translation—6 pages.

(Continued)

*Primary Examiner* — Lin Li
(74) *Attorney, Agent, or Firm* — RatnerPrestia (57) ABSTRACT

There is provided a numerical controller capable of substituting a gesture function of the touch panel with a keyboard. The numerical controller performs a gesture operation by key input. The numerical controller includes: a key input unit that includes first and second keys; an action point specifying unit that sets an action point of the gesture operation in response to an input of the first key; and a gesture virtual input unit that outputs a gesture input signal indicating the gesture operation in response to an input of the second key.

4 Claims, 6 Drawing Sheets

(56) References Cited

U.S. PATENT DOCUMENTS

| | | | |
|---|---|---|---|
| 2007/0103453 A1* | 5/2007 | Choo | G06F 3/03547 345/173 |
| 2007/0200822 A1* | 8/2007 | Iso | G06F 3/0426 345/156 |
| 2009/0117943 A1* | 5/2009 | Lee | H04N 21/485 455/566 |
| 2010/0085313 A1* | 4/2010 | Rider | G06F 3/04886 345/173 |
| 2010/0149102 A1 | 6/2010 | Onda et al. | |
| 2011/0210917 A1 | 9/2011 | LaFave et al. | |
| 2013/0019182 A1* | 1/2013 | Gil | G06F 3/0482 715/738 |
| 2013/0113717 A1* | 5/2013 | Van Eerd | G06F 3/016 345/173 |
| 2014/0215375 A1* | 7/2014 | Dong | G06F 3/04847 715/773 |
| 2014/0218372 A1 | 8/2014 | Missig et al. | |
| 2014/0267029 A1* | 9/2014 | Govil | G06F 3/0304 345/157 |
| 2015/0058776 A1 | 2/2015 | Liu et al. | |
| 2015/0121285 A1* | 4/2015 | Eleftheriou | G06F 3/04842 715/773 |
| 2015/0293592 A1* | 10/2015 | Cheong | G06F 3/0416 345/173 |
| 2016/0170637 A1* | 6/2016 | Yang | G16H 40/63 715/773 |
| 2016/0259495 A1* | 9/2016 | Butcher | G06F 3/04883 |
| 2016/0370927 A1* | 12/2016 | Fang | G06F 1/1613 |
| 2017/0160882 A1* | 6/2017 | Park | H04N 21/42222 |
| 2017/0277347 A1 | 9/2017 | Li | |

FOREIGN PATENT DOCUMENTS

| | | |
|---|---|---|
| JP | 2003091352 A | 3/2003 |
| JP | 2007265151 A | 10/2007 |
| JP | 2008217131 A | 9/2008 |
| JP | 2010-250628 A | 11/2010 |
| JP | 5148547 B2 | 2/2013 |
| JP | 2014-164368 A | 9/2014 |
| JP | 2014533403 A | 12/2014 |

OTHER PUBLICATIONS

Notification of Reasons for Refusal for Japanese Application No. 2017-079845, dated Jul. 24, 2018, with translation, 7 pages.

Chinese Office Action for Chinese Application No. 201810330782.3, dated Apr. 17, 2020 with translation, 19 pages.

* cited by examiner

| NC PROGRAM: O1020 | ABSOLUTE COORDINATE | |
|---|---|---|
| G00Z14.5<br>Z95.<br>X72.4Y-25.67<br>(2NDROUGH)<br>(TOOL=D15L30FLAT)<br>T12M06<br>G91G00X67.14Y-26.675<br>Z-95<br>Z-8.2<br>G01X2.81Y10.902Z-6.5<br>X.966Y3.951<br>G17G03X1.114Y11.822R63.3 | X<br>Y<br>Z | 55.000<br>630.000<br>420.000 |
| | T<br>S | 12<br>200 |

| MACHINING SIMULATION | TOOL DATA |
|---|---|
| TOOL HOLDER<br>TOOL<br>WORKPIECE DURING MACHINING | TOOL NUMBER T=12<br>TOOL SHAPE = FLAT END MILL<br>TOOL LENGTH L= 30.0 mm<br>TOOL DIAMETER D= 15.0 mm<br><br>TOOL LENGTH L<br>TOOL DIAMETER D |

STATE: OPERATING
ALARM: EXCESSIVE LOAD

FIG.3

| | | |
|---|---|---|
| WHEN KEY IS NOT PUSHED | UP, DOWN, LEFT AND RIGHT MARK CURSOR | ✥ |
| PUSH LEFT CURSOR KEY | LEFT ARROW CURSOR | ⬅ |
| PUSH RIGHT CURSOR KEY | RIGHT ARROW CURSOR | ➡ |
| PUSH UPPER CURSOR KEY | UPPER ARROW CURSOR | ⬆ |
| PUSH LOWER CURSOR KEY | LOWER ARROW CURSOR | ⬇ |
| PUSH RIGHT AND UPPER CURSOR KEYS | RIGHT ROTATION CURSOR | ⤴ |
| PUSH LEFT AND LOWER CURSOR KEYS | LEFT ROTATION CURSOR | ⤵ |
| PUSH LEFT AND RIGHT CURSOR KEYS | TWO LEFT AND RIGHT ARROWS CURSOR | ⬌ |
| PUSH LOWER AND UPPER CURSOR KEYS | TWO LEFT AND RIGHT ARROWS CURSOR | ⬌ |

NUMERICAL CONTROLLER

CROSS-REFERENCE TO RELATED APPLICATION

This application is a new U.S. Patent Application that claims benefit of Japanese Patent Application No. 2017-079845, filed Apr. 13, 2017, the disclosure of this application is being incorporated herein by reference in its entirety for all purposes.

BACKGROUND OF THE INVENTION

1. Field of the Invention

The present invention relates to a numerical controller. More particularly, the present invention relates to a numerical controller capable of substituting a gesture function of a touch panel with a keyboard.

2. Description of the Related Art

There is a numerical controller equipped with a display function which can magnify, reduce, move, and scroll documents and figures. Among these numerical controllers, some have multi-touch type touch panels capable of detecting a plurality of contact points. A gesture function of an OS (operating system) recognizes a gesture such as slide, pinch, and rotation performed by users on the touch panels. Then, the application realizes an operation such as magnification, reduction, movement and scroll according to the recognized gesture.

Figure 8:
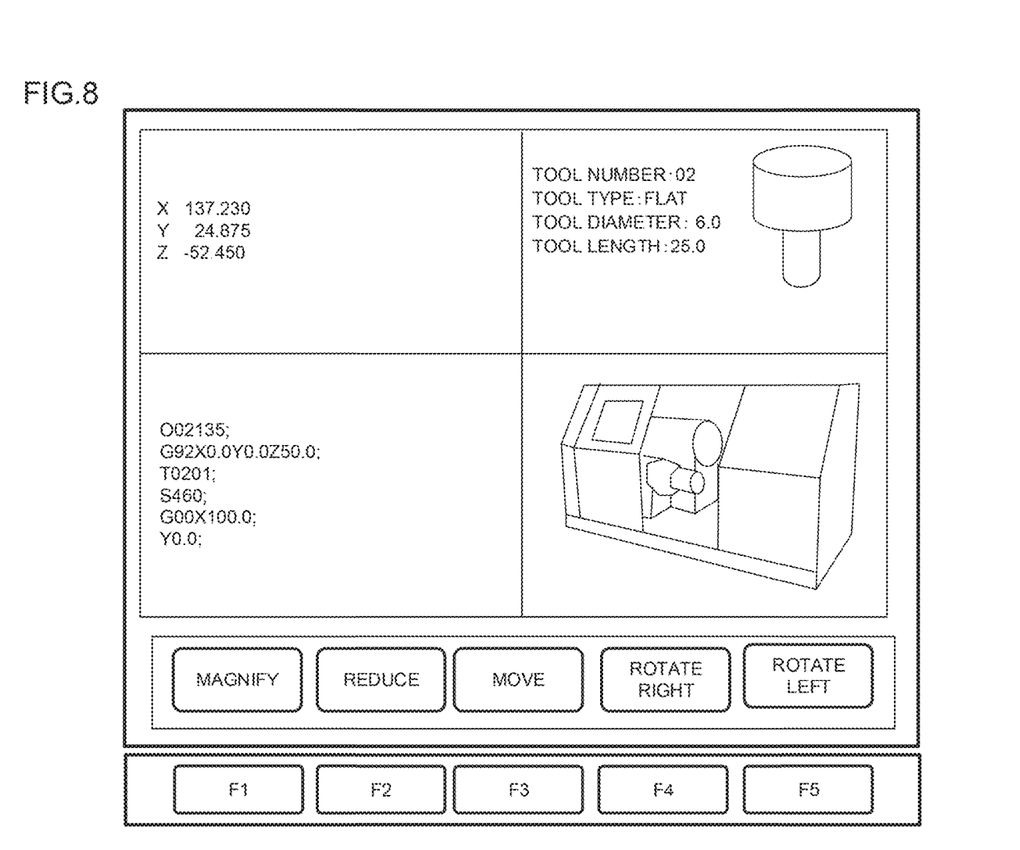
FIG. 8 is a view illustrating a conventional numerical controller.

On the other hand, a numerical controller not having a multi-touch type touch panel cannot detect a user's gesture, and therefore cannot use the function of the application corresponding to the gesture function. Many numerical controllers are not equipped with a touch panel due to difficulty in operating a touch panel under severe working environments. Therefore, conventionally, as illustrated in FIG. 8, operation buttons for realizing functions such as magnification, reduction, movement, and scroll independently by the application are implemented and arranged on an application screen, or these functions are assigned to soft keys (function keys) to make an elaboration which enables a numerical controller that does not have a multi-touch type touch panel to perform an operation.

However, this elaboration of the application increases the cost of application development. In addition, differences in user interfaces per each application are likely to cause a decrease in operability. Therefore, a gesture function which is not dependent on a multi-touch type touch panel is desirably realized not uniquely for each application, but on a platform common to the applications. Japanese Patent Application Laid-Open No. 2014-164368A and JP 5148547 B2 disclose keyboards which, when a user performs an operation of moving a finger on a key arrangement surface on which a plurality of keys is aligned similarly to a touch panel, recognize this operation as a gesture input.

However, Japanese Patent Application Laid-Open No. 2014-164368 and JP 5148547 B2 have problems that it is difficult to smoothly trace the key alignment surface like the touch panel. There is also a problem that it is not easy to specify a touch point on the screen due to the keyboard.

SUMMARY OF THE INVENTION

The present invention has been made to solve the above problems, and it is an object of the present invention to provide a numerical controller capable of substituting a gesture function of a touch panel with a keyboard.

A numerical controller according to an embodiment of the present invention is a numerical controller that performs a gesture operation by a key input, and includes: a key input unit that includes first and second keys; an action point specifying unit that sets an action point of the gesture operation in response to an input of the first key; and a gesture virtual input unit that outputs a gesture input signal indicating the gesture operation in response to an input of the second key.

The numerical controller according to the embodiment of the present invention further includes a display unit that displays a screen including a plurality of areas, and the key input unit has a plurality of the first keys, one of the first keys and one of the areas are associated in advance, and the action point specifying unit sets the action point in the area associated with the first key in advance.

In the numerical controller according to the embodiment of the present invention, the gesture virtual input unit includes a first operation of selecting a type of the gesture operation, and a second operation of determining a type of the gesture operation.

In the numerical controller according to the embodiment of the present invention, the first operation is push of the second key, and the second operation is continuous push of the second key for a predetermined period of time.

The numerical controller according to the embodiment of the present invention further includes a mode switching unit that activates the action point specifying unit and the gesture virtual input unit, and the action point specifying unit and the gesture virtual input unit are activated to change an operation of the numerical controller at a time of the inputs of the first and second keys.

The numerical controller according to the embodiment of the present invention further includes a display unit that displays a screen including a plurality of areas, and the display unit displays a cursor at the action point in response to the input of the first key.

The numerical controller according to the embodiment of the present invention further includes a display unit that displays a screen including a plurality of areas, and the display unit displays a cursor corresponding to the gesture operation in response to the input of the second key.

A method according to the embodiment of the present invention is a method for performing a gesture operation by a key input in a numerical controller, and includes: selecting one of the plurality of areas displayed on a screen by an input of a first key; selecting a type of the gesture operation by an input of a second key; and determining a type of the gesture operation by the input of the second key.

According to the present invention, it is possible to provide a numerical controller capable of substituting the gesture function of the touch panel with the keyboard.

BRIEF DESCRIPTION OF THE DRAWINGS

Aforementioned and other objects and characteristics of the present invention will be made more apparent from description of the following embodiment in view of the accompanying drawings. Of these drawings.

DETAILED DESCRIPTION OF THE PREFERRED EMBODIMENTS

An embodiment of the present invention will be described below with reference to the drawings.

Figure 1:
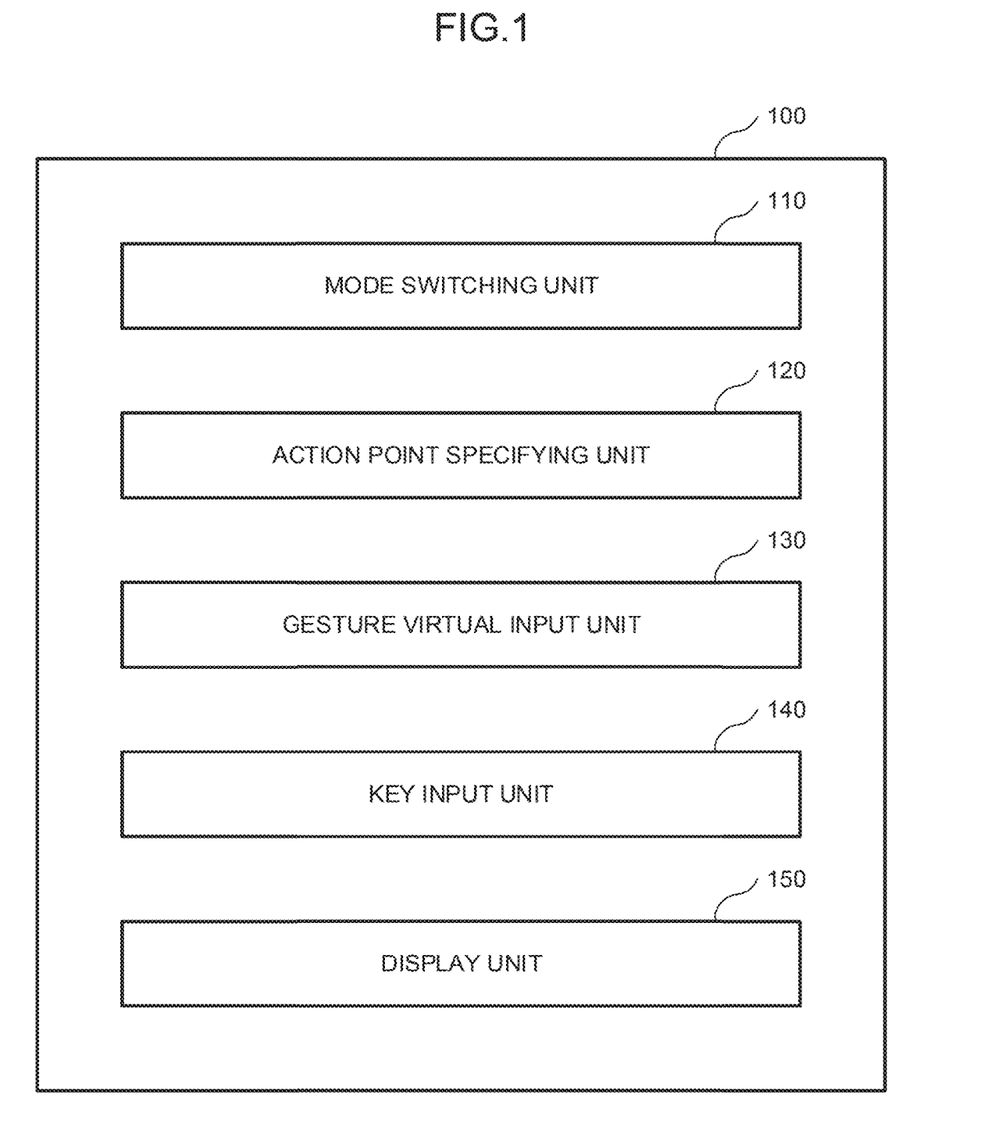
FIG. 1 is a block view illustrating a configuration of a numerical controller.

FIG. 1 is a block view illustrating a configuration of a numerical controller 100 according to the embodiment of the present invention. The numerical controller 100 includes a mode switching unit 110, an action point specifying unit 120, a gesture virtual input unit 130, a key input unit 140, and a display unit 150. Typically, the numerical controller 100 is an information processing apparatus including a central processing unit (CPU), a storage device, and input/output devices such as a keyboard and a display, and when the CPU executes a predetermined program, realizes each unit.

The key input unit 140 is a user interface for a key input, and is typically a keyboard having a plurality of physical keys. Alternatively, the key input unit 140 may be other arbitrary user interface capable of receiving a key input signal.

The display unit 150 is a user interface which displays screens output from the OS and applications, and is typically various display devices.

The mode switching unit 110 is a unit which switches between a keyboard mode and a touch panel mode. More specifically, the mode switching unit 110 switches an output destination of an output signal from the key input unit 140 to one of a normal keyboard driver and a virtual touch panel driver newly provided in the present embodiment. The mode switching unit 110 performs the above-described switching by, for example, being triggered by push of an arbitrary key provided in the key input unit 140, execution of a switching command implemented in the application or selection of an arbitrary soft key.

The action point specifying unit 120 is a unit which specifies an action point of the gesture operation. The action point refers to a coordinate that serves as a reference point of an application operation performed in response to the gesture operation. For example, in terms of a general touch panel operation, the action point is a slide start point of a slide operation, or a midpoint of two points of the touch panel touched by a user in a case of a pinch operation or a rotation operation. Typically, the action point specifying unit 120 is implemented as part of the virtual touch panel driver, and sets an action point in response to a specific key input in the key input unit 140.

Figure 2:
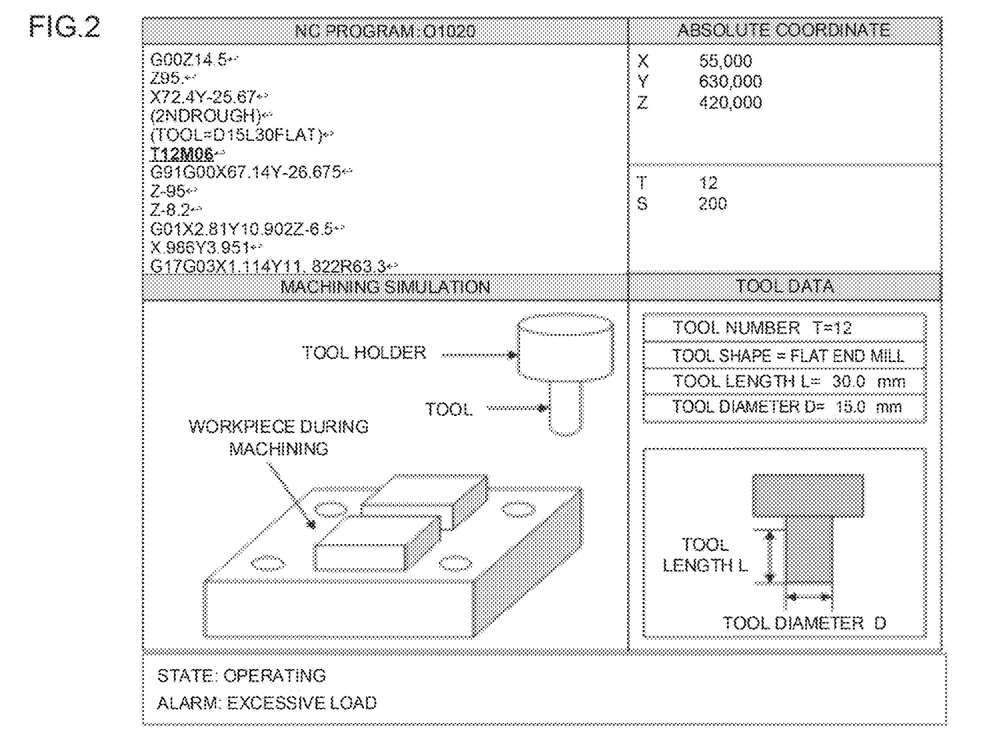
FIG. 2 is a view for explaining the operation of an action point specifying unit.

An example of action point setting processing will be described with reference to FIG. 2. FIG. 2 illustrates an example of a display screen of the numerical controller. In this example, the display screen includes five windows (four windows having window titles of "NC program", "absolute coordinate", "machining simulation", and "tool data", and a status display window at a lowermost portion), and each window can operate independently. For example, a 3D model output by a CAD application is displayed on the "machining simulation" window, and can be operated to scroll, magnify, reduce or rotate according to the user input. A program list is displayed in the "NC program", and can be operated to scroll, magnify and reduce according to the user input. Thus, each window shows different operations executed according to each gesture operation depending content.

Each of these windows is assigned a special key on a one-to-one basis. Special keys such as "Position", "Program" "Tool Offset", "Graph" and "Message" which are keys unique to the numerical controller can be assigned. In this way, the present invention can be easily applied to numerical controllers with a relatively small number of keys, too.

It should be noted that the present invention is not limited to this and an arbitrary key can be used as a special key. The action point specifying unit 120 holds in advance an association between these special keys and the windows. When detecting that the special key associated with the window is pushed in the touch panel mode, the action point specifying unit 120 sets the action point at, for example, the center of a display area of the window.

Although a display screen having a plurality of windows has been described as an example here, the present invention is not limited to this. The action point specifying unit 120 can specify an arbitrary display area among the display screens having a plurality of display areas by using a special key, and set the action point at an arbitrary position within the area. Here, different applications may operate in each display area, or a single application may use a plurality of display areas. A plurality of display areas do not necessarily need to be independently operable, and may have some linkage or a subordinate relationship. Further, it is not necessary for a plurality of display areas to be explicitly partitioned so that the user can recognize the display areas. For example, even when the screen output by the application has only a single display area, the action point specifying unit 120 internally divides the single screen area into a plurality of sections, and each section can be assigned keys. Alternatively, in response to a predetermined key input, the action point specifying unit 120 may collectively execute processing of setting the respective action points in all the display areas.

The gesture virtual input unit 130 is a unit which converts the user's key input into a gesture operation and outputs the user's key input to the application. The gesture operation refers to, for example, various operations such as slide, pinch, and rotation performed on the touch panel. Typically, the gesture virtual input unit 130 is implemented as part of the virtual touch panel driver, specifies a corresponding gesture operation in response to the key input in the key input unit 140, and outputs a gesture input signal indicating that the gesture operation has been performed on the touch panel, to the application. Preferably, the gesture virtual input unit 130 feeds back the gesture operation specified in accordance with the key input to the user by displaying the gesture operation on the screen.

Figure 3:
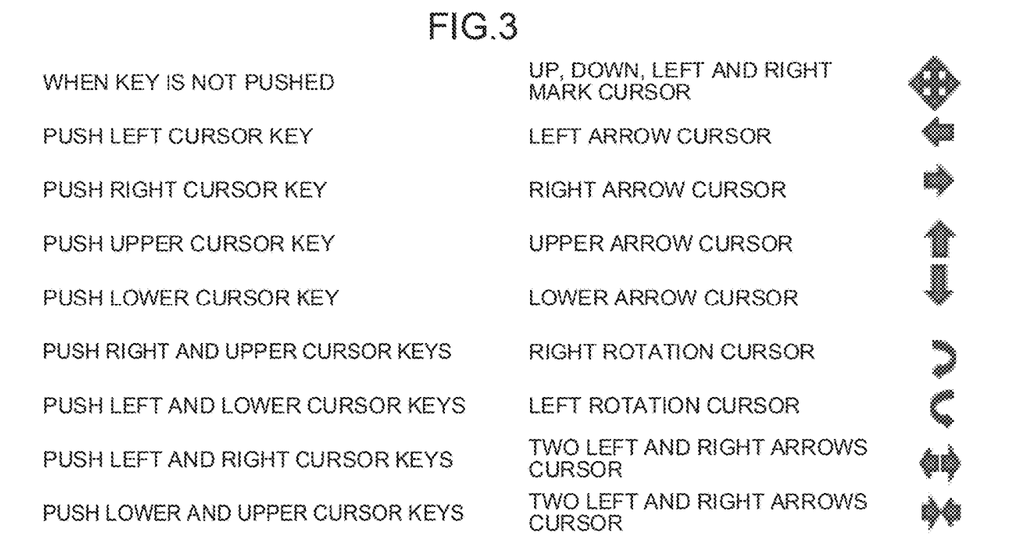
FIG. 3 is a view for explaining the operation of the gesture virtual input unit.

An example of the operation of the gesture virtual input unit 130 will be described with reference to FIG. 3. The gesture virtual input unit 130 holds the association between key inputs from the key input unit 140 and predetermined gesture operations in advance. For example, a slide operation in a left direction can be associated with an input of a left cursor key. A slide operation in a right direction can be associated with an input of a right cursor key. A slide operation in an upper direction can be associated with an input of an upper cursor key. A slide operation in a lower direction can be associated with the input of a lower cursor key. A rotation operation in the right direction can be associated with simultaneous push of the right cursor key and the upper cursor key. A rotation operation in the left direction can be associated with simultaneous push of the left cursor key and the lower cursor key. A pinch out operation can be associated with simultaneous push of the right cursor key and the left cursor key. A pinch in operation can be associated with simultaneous push of the upper cursor key and the lower cursor key. It is to be noted that the present invention is not limited to the association described here. The association between the key inputs and the gesture operations can be arbitrarily set. The present embodiment will be described assuming the above association.

When no key is input by the key input unit 140, the gesture virtual input unit 130 displays an up, down, left and right mark cursor on the screen. It is preferable that the display position is the aforementioned action point. As a result, the user can recognize the currently set action point and a status of input standby for the key signal corresponding to the gesture operation. When the left cursor key is pushed by the key input unit 140, the gesture virtual input unit 130 displays the left arrow cursor on the screen. It is preferable that the display position is the aforementioned action point. Accordingly, the user can recognize the currently set action point and the status that the key signal corresponding to the slide operation in the left direction is being input. Similarly, the gesture virtual input unit 130 displays a right arrow in response to the push of the right cursor key, an upper arrow in response to the push of the upper cursor key, and a lower arrow in response to the push of the lower cursor key on the screen. When the right cursor key and the upper cursor key are simultaneously pushed by the key input unit 140, the gesture virtual input unit 130 displays a right rotation cursor on the screen. It is preferable that the display position is the aforementioned action point. Accordingly, the user can recognize the currently set action point and the status that the key signal corresponding to the rotation operation in the right direction is being input. Similarly, the gesture virtual input unit 130 displays a left rotation cursor on the screen in response to simultaneous push of the left cursor key and the lower cursor key. When the left cursor key and the right cursor key are simultaneously pushed by the key input unit 140, the gesture virtual input unit 130 displays the left arrow and right arrow cursors on the screen. It is preferable that the display position is the aforementioned action point. Accordingly, the user can recognize the currently set action point and the status that the key signal corresponding to the pinch out operation is being input. Similarly, by displaying the lower arrow and upper arrow cursors on the screen in response to simultaneous push of the lower cursor key and the upper cursor key, the gesture virtual input unit 130 can display the status that the key signal corresponding to the pinch in operation is being input.

The gesture virtual input unit 130 preferably decides whether or not the key input from the key input unit 140 continues for a certain period of time. When the key input continues for a certain period of time, the gesture virtual input unit 130 converts the key input from the key input unit 140 into a signal indicating the gesture operation according to the above association. That is, the gesture input signal corresponding to the key input is generated and output to the application.

For example, when it is detected that the input of the left cursor key continues for a certain period of time or more, the gesture virtual input unit 130 generates a gesture input signal corresponding to the slide operation in the left direction. Specifically, while the left key is being pushed, the gesture virtual input unit 130 continues outputting a contact point while moving coordinates of the contact point in the left direction by a predetermined distance every time t. Here, the contact point refers to the coordinates output by the touch panel driver when a touch operation is detected on the touch panel. At coordinates t=0, the output contact point is an action point. If a moving distance (i.e., sliding speed) of the contact point per unit time is k, an x coordinate of the contact point at t=1, 2, . . . and n changes by −k, −2 k, . . . and −tk from the action point as a start point. Here, k may be arbitrarily settable. Similarly, when the right cursor key, the upper cursor key, and the lower cursor key are continuously input for the certain period of time or more, the gesture virtual input unit 130 can output a gesture input signal corresponding to a slide operation in the right direction, the upper direction, and the lower direction. Further, when the right cursor key, the upper cursor key, the left cursor key and the lower cursor key are continuously input for the certain period of time or more, the gesture virtual input unit 130 can output a gesture input signal corresponding to a rotation operation in the right direction and the left direction corresponding to these cursor keys. Further, when the left cursor key, the right cursor key, the lower cursor key and the upper cursor key are continuously input for the certain period of time or more, the gesture virtual input unit 130 can output a gesture input signal corresponding to the pinch in and pinch out operations corresponding to these cursor keys.

In this way, by activating the gesture operation when the key input continues for the certain period of time or more, the gesture virtual input unit 130 can distinguish between a normal key input and a key input for performing the gesture operation. That is, it is possible to output a normal key input signal for a key input which continues for less than the certain period of time, and output a gesture input signal for a key input which continues for the certain period of time or more. This makes it possible to perform the gesture operation by using the keyboard in numerical controllers having a small number of keys, too.

Figure 4:
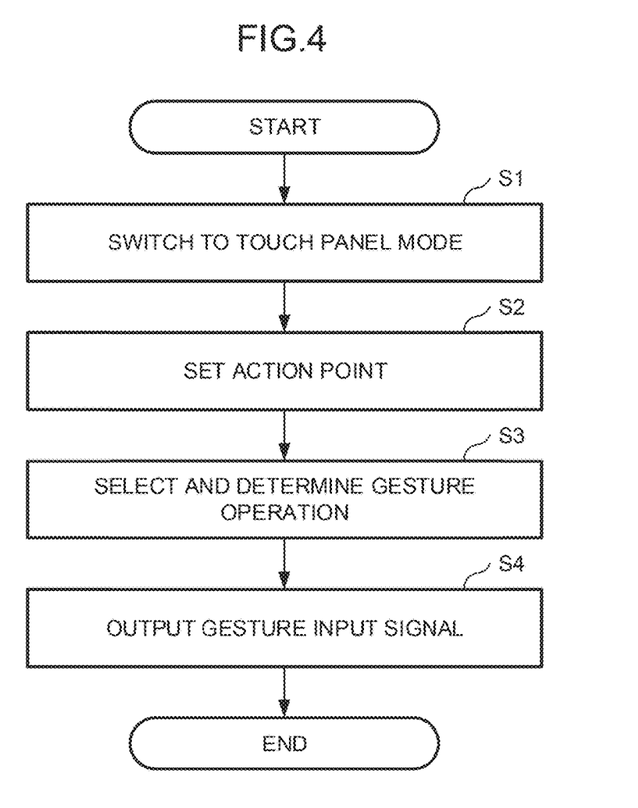
FIG. 4 is a flowchart illustrating an operation of the numerical controller.

An operation procedure of the numerical controller 100 will be described with reference to a flowchart of FIG. 4.

S1: The mode switching unit 110 switches the keyboard driver from the keyboard mode using the normal keyboard driver to the touch panel mode using the virtual touch panel driver in response to a predetermined key input.

S2: The action point specifying unit 120 detects an input of a special key and sets an action point of a gesture operation. For example, the action point specifying unit 120 sets the action point at the center of the window associated with the special key. At this time, the display unit 150 displays the cursor on the action point.

S3: The gesture virtual input unit 130 detects an input of the upper, lower, left or right cursor key, and generates and outputs a gesture input signal. At this time, the display unit 150 displays the cursor indicating a type of the gesture operation on the action point.

S4: The gesture input signal output by the gesture virtual input unit 130 is delivered to the application. On the application, a function or an operation corresponding to the gesture input signal output by the gesture virtual input unit 130 is realized.

Subsequently, the embodiment of the numerical controller 100 will be described with reference to FIGS. 5 and 6. As illustrated in FIG. 4, the numerical controller 100 according to the present embodiment has a keyboard as the key input unit 140 and a display device as the display unit 150. As the mode switching unit 110, a mode switching key provided on the keyboard is used. Also, the keys "Position", "Program", "Tool Offset", "Graph" and "Message" on the keyboard are used by the action point specifying unit 120. These five keys are associated with the five windows displayed on the display, respectively, and are used for setting action points in these windows. In addition, the upper, lower, left and right cursor keys on the keyboard are used by the gesture virtual input unit 130.

Figure 5:
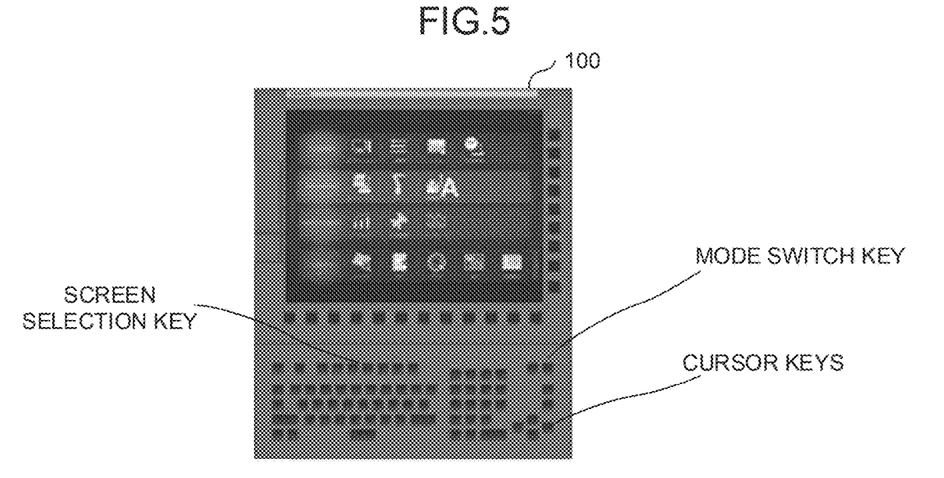
FIG. 5 is a view illustrating one embodiment of the numerical controller.
Figure 6:
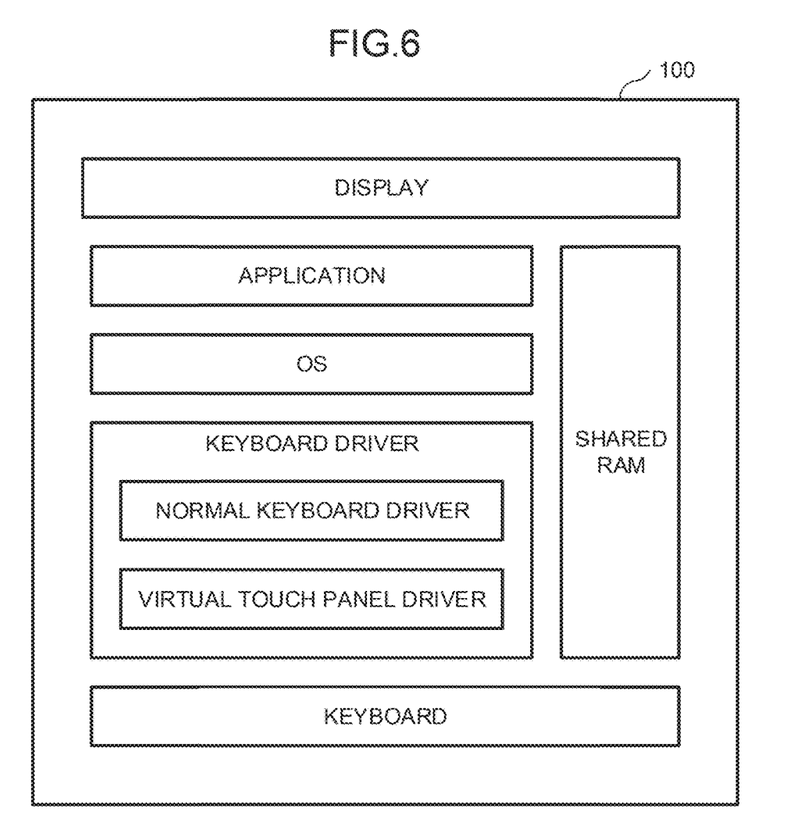
FIG. 6 is a view illustrating the one embodiment of the numerical controller.

As illustrated in FIG. 5, typically, the numerical controller 100 includes an OS, the keyboard driver, the application, and a shared RAM. The keyboard driver has built-in functions of the normal keyboard driver and the virtual touch panel driver, and when the mode switching key is input, switches the keyboard mode which operates as the normal keyboard driver and the touch panel mode which operates as the virtual touch panel driver. That is, when the touch panel mode is activated, the keyboard driver activates the virtual touch panel driver. In this way, the keyboard driver realizes the function of the mode switching unit 110. Note that in the touch panel mode, the keyboard driver may deliver an input of an upper, lower, left and right cursor key exclusively to the virtual touch panel driver without delivering the input to the normal keyboard driver. Alternatively, as described above, to which driver the input is delivered may be determined according to an input duration time of the upper, lower, left, and right cursor key.

Also, when each key (hereinafter referred to as a screen selection key) of "Position", "Program", "Tool Offset", "Graph" and "Message" is input in the touch panel mode, the keyboard driver sets the action point in each window associated with each screen selection key. In this way, the keyboard driver realizes the function of the action point specifying unit 120. Furthermore, when the upper, lower, left or right cursor key is input in the touch panel mode, the keyboard driver generates a corresponding gesture input signal and outputs the gesture input signal to the OS. In this way, the keyboard driver realizes the function of the gesture virtual input unit 130.

The OS outputs a key input signal or a gesture input signal output from the keyboard driver to the application. That is, the OS outputs an operation event such as slide, rotation or pinch to the application.

The application executes a predetermined operation according to the key input signal or the gesture input signal obtained from the OS. The function or the operation assigned to the gesture input signal can arbitrarily be implemented for each application. For example, when a gesture input signal of vertical slide is detected, the application that displays a program list can perform an operation to vertically scroll the program list. In addition, when the gesture input signal of horizontal slide is detected, the application can execute the function of switching a system of the content which is being displayed. When a gesture input signal of the vertical slide is detected, the application that displays the tool data can perform an operation of increasing or decreasing a tool number. Further, when the gesture input signal of the horizontal slide is detected, the application can execute the function of switching a tool type.

The shared RAM is a storage area that can be used for sharing information between the OS or the application and the keyboard driver. For example, the OS or the application writes a window display position (e.g., a set of coordinates indicating two end points of a rectangular area) in the shared RAM when currently displaying the window on the display device. When a plurality of windows is displayed, each window display position is written in the shared RAM. For example, when setting the action point, the keyboard driver can refer to the shared RAM, obtain the window display position assigned to the special key, and calculate an action point based on the display position.

Figure 7:
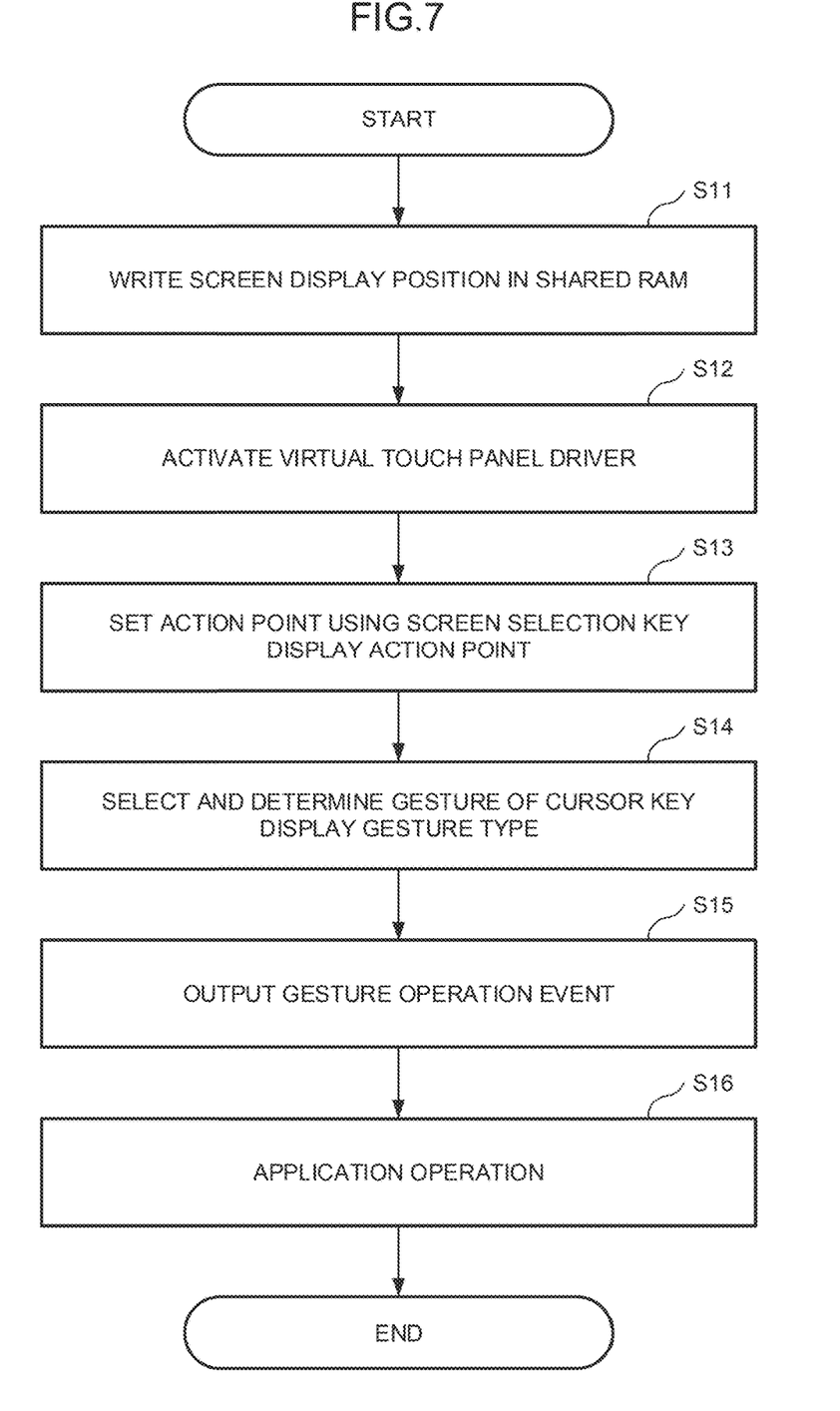
FIG. 7 is a flowchart illustrating the operation according to the one embodiment of the numerical controller.

An operation procedure of the numerical controller 100 according to the present embodiment will be described with reference to the flowchart of FIG. 7.

S11: When displaying the screen (window), the OS or the application writes a screen display position in the shared RAM.

S12: The keyboard driver mutually switches the mode of the keyboard driver between the keyboard mode and the touch panel mode each time the mode switching key on the keyboard is pushed. When the mode is switched to the touch panel mode, the virtual touch panel driver is activated.

S13: The virtual touch panel driver periodically monitors a state of the screen selection key. When detecting the push of the screen selection key, the virtual touch panel driver reads the screen position associated with the pushed screen selection key from the shared RAM. Further, the virtual touch panel driver obtains the center point of the screen based on the obtained screen position, and sets the center point as an action point. Further, the virtual touch panel driver displays a predetermined cursor at the center point. Thus, the virtual touch panel driver indicates the position of the action point and the touch panel mode to the user.

S14: The virtual touch panel driver periodically monitors the state of the cursor key. When it is detected that the cursor key is being pushed continuously for a certain period of time, the virtual touch driver generates a gesture input signal associated with the pushed cursor key, and repeatedly outputs the gesture input signal to the OS.

S15: When obtaining the gesture input signal, the OS outputs an operation event to the application.

S16: The application executes a function or an operation corresponding to the operation event.

According to the present embodiment, the virtual touch panel driver recognizes the action point of the gesture operation and the gesture operation based on the input signal from the keyboard, and converts the action point of the gesture operation and the gesture operation into the input signal indicating the gesture operation. Thus, even numerical controllers having no touch panel can easily use the touch panel compatible function of the application. In addition, common gesture operations can be performed by common key inputs in all applications, so that operability is improved. In addition, since an individual elaboration is unnecessary on the application side, development cost can be suppressed.

It should be noted that the present invention is not limited to the above-described embodiment, and can be appropriately changed without departing from the scope of the invention. Within the scope of the invention, the present invention enables modification of any components of the embodiment or omission of any component of the embodiment.

For example, the present invention includes assigning arbitrary key inputs to various gesture operations which are not mentioned in the above embodiment. That is, the above-described embodiment has described the example where the upper, lower, left and right cursor keys or combinations thereof are assigned to gesture operations such as slide, rotation, and pinch. However, the gesture operation is not limited to these. In addition, keys other than the upper, lower, left, and right cursor keys or combinations thereof may be assigned to arbitrary gestures.

Further, the above-described embodiment has described the example where the action point is set at the center of the display area selected by the action point specifying unit 120. However, the position of the action point may be arbitrarily set. For example, text data is often described on a left side of a screen. Therefore, an application which displays text data makes it easy to visually recognize content by setting an action point at the left end of the screen even when a magnifying/reducing operation is performed.

The embodiment of the present invention has been described above. However, the present invention is not limited to the example of the above embodiment and can be carried out in various modes by adding optional changes.

The invention claimed is:

1. A numerical controller for performing a gesture operation by a key input, the numerical controller comprising:
   a key input unit that includes a plurality of first keys and a plurality of cursor keys, the key input unit serves as a physical keyboard in a physical keyboard mode or a virtual touch panel in a virtual touch panel mode;
   a mode switching unit for switching the key input unit between the physical keyboard mode and the virtual touch panel mode;
a display unit for displaying a screen including a plurality of windows,
wherein each of the plurality of first keys are predetermined to be associated with a respective one of the plurality of windows, and
wherein each of the plurality of cursor keys are predetermined to be associated with a respective one of a plurality of arrows,
   an action point specifying unit that sets an action point within the respective one of the plurality of windows associated with the one of the first keys in response to an input of the one of the first keys, the action point indicating coordinates in the respective one of the plurality of windows, the coordinates are separate from respective key locations of the plurality of cursor keys on the physical keyboard or the virtual touch panel; and
   a gesture virtual input unit that:
   in response to an input of a first one of the cursor keys, outputs a first gesture input signal indicating a first arrow of the plurality of arrows associated with the first one of the cursor keys, controls the display unit to display the first arrow on the screen at the action point, and
   in response to an input of a second one of the cursor keys, outputs a second gesture input signal indicating a second arrow of the plurality of arrows associated with the second one of the cursor keys, and controls the display unit to display the second arrow on the screen at the action point,
   wherein the first arrow points in a different direction than the second arrow, and
   wherein the activation of the action point specifying unit and the gesture virtual input unit is effected through the mode switching unit.

2. The numerical controller according to claim 1, wherein the gesture virtual input unit moves a contact point of the gesture generation, and continues to output, when the cursor keys are continuously input for certain period of time or more.

3. The numerical controller according to claim 1, wherein the first keys include any of Position, Program, Tool Offset, Graph, and Message and the second key is a cursor key.

4. The numerical controller according to claim 1, further comprising
   a mode switching unit that activates the action point specifying unit and the gesture virtual input unit,
   wherein the mode switching unit activates the action point specifying unit and the gesture virtual input unit to change an operation of the numerical controller at a time of the inputs of the first keys and the cursor keys, while the cursor key input continues for a certain period of time.

* * * * *